(12) United States Patent
Ang et al.

(10) Patent No.: US 6,724,562 B1
(45) Date of Patent: Apr. 20, 2004

(54) SEGMENTED CONSTANT ANGLE TRACKPITCH

(75) Inventors: Chiap Heok Ang, Singapore (SG); Niroot Jierapipatanakul, Singapore (SG); Beng Theam Ko, Singapore (SG); Myint Ngwe, Singapore (SG); Beng Wee Quak, Singapore (SG); Choonkiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/538,535

(22) Filed: Mar. 30, 2000

Related U.S. Application Data

(60) Provisional application No. 60/141,610, filed on Jun. 30, 1999.

(51) Int. Cl.[7] ............................................. G11B 5/596
(52) U.S. Cl. ...................................................... 360/78.04
(58) Field of Search ........................... 360/78.04, 77.08, 360/48

(56) References Cited

U.S. PATENT DOCUMENTS

| | | | | | |
|---|---|---|---|---|---|
| 5,255,136 A | * | 10/1993 | Machado et al. | ........ | 360/77.02 |
| 5,940,237 A | * | 8/1999 | Takagi | .......................... | 360/75 |
| 6,507,450 B1 | * | 1/2003 | Elliott | ..................... | 360/77.08 |

* cited by examiner

*Primary Examiner*—David Hudspeth
*Assistant Examiner*—Mitchell Slavitt
(74) *Attorney, Agent, or Firm*—Mitchell K. McCarthy

(57) ABSTRACT

A method for writing servo patterns on at least one disc in a disc drive that has a first set of tracks and a second set of tracks on a major surface of the disc includes stepping between the tracks of the first set of tracks at a first constant angle, and stepping between the tracks of the second set of tracks at a second constant angle. Stepping between tracks in the first group or the second group includes selecting two adjacent tracks from either the first group of tracks or the second group of tracks, and determining the angle through which an actuator assembly must be rotated between the two adjacent tracks selected to produce a selected track pitch. The method produces a disc for a disc drive with a first set of tracks, and a second set of tracks in which the track pitch varies across the set of tracks.

15 Claims, 11 Drawing Sheets

| | AVERAGE TRACK PITCH ($\mu"$) | TRACK PITCH Stdev | MAX TRACK PITCH ($\mu"$) | MIN TRACK PITCH ($\mu"$) | MAX TRACK PITCH DIFFERENCE ($\mu"$) |
|---|---|---|---|---|---|
| CONSTANT ANGLE | 76.67 | 1.23E-06 | 78.06 | 74.05 | 4.01 |
| SEGMENTED CONSTANT ANGLE | 76.61 | 245.0E-9 | 76.95 | 76.23 | 0.72 |

FIG. 8

SEGMENTED CONSTANT ANGLE TRACKPITCH

RELATED APPLICATION

This application claims the benefit under 35 U.S.C. 119(e) of U.S. Provisional Application Ser. No. 60/141,610 filed Jun. 30, 1999.

FIELD OF THE INVENTION

The present invention relates to the field of mass storage devices. More particularly, this invention relates to an improved apparatus and method for writing servo information to the disc of a high density disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc drive housing, a disc that is rotated, an actuator assembly that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support the transducer over the disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the transducers) can be positioned over any radial location along the rotating disc surface.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Transducers, in the form of read/write heads attached to the sliders, located on both sides of the storage disc, read and write information on the storage discs when the transducers are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. To write to or read from different tracks, the read/write head is moved radially across the tracks to a selected target track. The data is often divided between several different tracks. While most storage discs utilize a multiplicity of concentric circular tracks, other discs have a continuous spiral forming a single track on one or both sides of the disc.

During manufacture, servo information is encoded on the disc and subsequently used to accurately locate the transducer. The written servo information is used subsequently to locate the actuator assembly/transducer head at the required position on the disc surface and hold it very accurately in position during a read or write operation. The servo information is written or encoded onto the disc with a machine commonly referred to as a servo track writer (hereinafter STW). At the time the servo information is written, the disc drive is typically at the "head disk assembly" (hereinafter HDA) stage. The HDA includes most of the mechanical drive components but does not typically include all the drive electronics. During the track writing process, the STW precisely locates the transducer heads relative to the disc surface and writes the servo information thereon. Accurate location of the transducer heads is necessary to ensure that the track definition remains concentric.

Servo track writing includes writing a first servo track and then repositioning the transducer to a second position. At the second position, an adjacent servo track is written. The process of moving the transducer from the first position to the second position is referred to as stepping. This stepping process is repeated over and over until the entire disc surface is provided with a number of servo tracks that can be used to located the tracks of data on a disc. Currently, disc drives have discs with up to 2000 tracks in an inch written thereon. A constant desire or industry goal is to increase the storage capacity of disc drives. One way to increase capacity is to increase the density of tracks on the disc. Currently, the number of tracks per inch (TPI) is growing at a rate of 60% per year. It is contemplated that this trend will continue and, as a result, higher track densities will be the norm in the future.

The most common method of stepping during the servo writing process is to move the actuator assembly through a constant angle between the first position and the second position adjacent the first position. The actuator used in the servo write process pivots. Each time the actuator is moved or stepped it is moved through a fixed angle. This method is the quickest way of stepping or repositioning the transducing head used to servo write the disc. Quickness is a factor since the time required to servo write a disc drive is lengthy. In many instances, servo writing a head disc assembly is considered one of the bottlenecks during manufacture. With the increased number of tracks on a disc and the constant trend to increase the number of tracks per inch, the length of time for servo writing discs will also increase. Another pressure is to cut down production time for disc drives.

One problem associated with constant angular stepping is that the track width is wider at the inner diameter of the disc than the track width at the outer diameter of the disc. As a result, the off track performance is much better at the inner diameter of the disc than at the outer diameter of the disc. Off track performance is how well the disc drive reads data when the read head is positioned at a distance from the center of the track. In other words, when reading a track at the inner diameter the read head may be positioned farther off the track than at a track at the outer diameter with the ability to read the data without error or with soft errors.

There is one way to solve the problem of difference in off track performance. The solution has other problems. Rather than step the actuator assembly through a constant angle, the actuator assembly can be stepped so as to produce tracks having the same width (constant track pitch). This process takes more time than the constant angle stepping process since the servo track writer needs to change the step angle for every track written in order to keep the track width (track pitch) constant. This requires the servo track writer to recalibrate the step angle for each track. This approach is impractical for manufacturing purposes since this method adds time to the potential bottleneck of servowriting the disc drive.

Accordingly, what is needed is an apparatus and method for use with a servo track writer (STW) that will allow the servo patterns to be written in tracks so that the off track performance is balanced between the inner diameter and the outer diameter. What is also needed is a disc drive in which the off track performance or capability is more uniform from the tracks at the inner diameter of the disc drive to the outer diameter of the disc drive. What is also needed is a method and apparatus which uses the current servo writing equipment.

SUMMARY OF THE INVENTION

The present invention is directed to reducing the problem of having better off track performance at tracks on the inner diameter than at tracks at the outer diameter. The present invention is directed toward evening out the off track performance and the off track capability of the read head at the various tracks across the disc. The present invention includes a method for writing servo patterns on at least one disc in a disc drive that has a first set of tracks and a second set of tracks on a major surface of the disc includes stepping between the tracks of the first set of tracks at a first constant angle, and stepping between the tracks of the second set of tracks at a second constant angle. Stepping between tracks in the first group or the second group includes selecting two adjacent tracks from either the first group of tracks or the second group of tracks, and determining the angle through which an actuator assembly must be rotated between the two adjacent tracks selected to produce a selected track pitch. The result is a series of track sets in which the value of the track pitch varies across the group. The track pitch value for each group is then reset for the next group by recalibrating another constant angle.

The method results in a disc for a disc drive with a first set of tracks, and a second set of tracks in which the track pitch varies across the set of tracks. The track pitch varies between a first value and a second value in the first group. The track pitch varies between a third value and a fourth value in the second group. The first value and the third value are approximately equal as are the second and fourth value of track pitch. The end result is that the track pitch stays more uniform across the surface of the disc.

Advantageously, the method and apparatus of the present invention allows servo patterns to be written on the various tracks of the disc so that the off track performance is balanced between tracks at or near the inner diameter of the disc and tracks at or near the outer diameter of the disc. Using the method and apparatus of the present invention, the off track performance and off track capability is more uniform between the tracks at the inner diameter of the disc drive to the tracks at the outer diameter of the disc drive.

BRIEF DESCRIPTION OF THE DRAWINGS

FIG. 8 is a table of the trackpitch comparing trackpitch to track number using the inventive method to the constant angle method.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
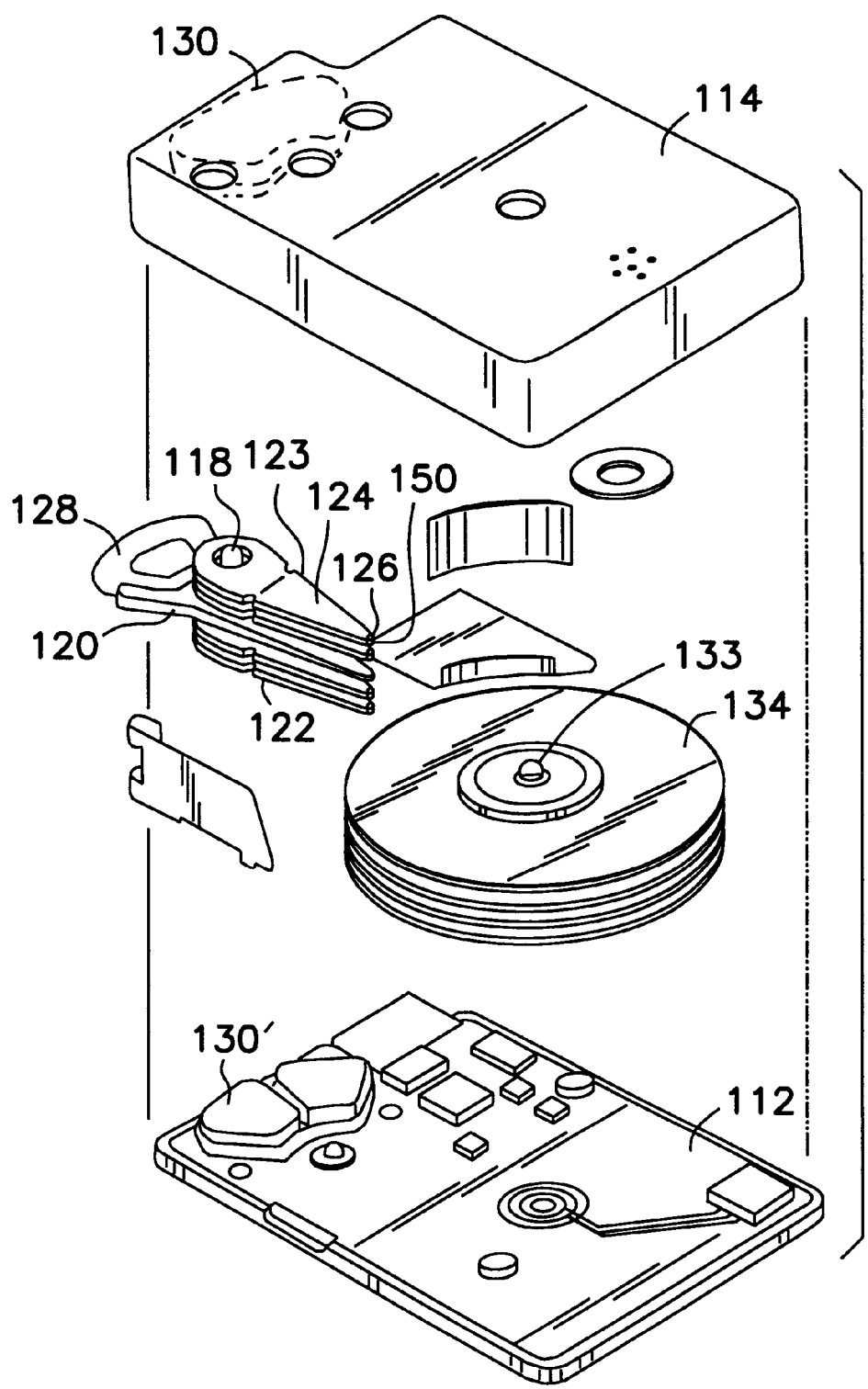
FIG. 1 is an exploded view of a disc drive with a multiple disc stack.

The invention described in this application is useful with most all mechanical configurations of disc drives utilizing either rotary or linear actuation. FIG. 1 is an exploded view of one type of a disc drive 100 having a rotary actuator. The disc drive 100 includes a housing or base 112, and a cover 114. The housing 112 and cover 114 form a disc enclosure. Rotatably attached to the housing 112 on an actuator pivot shaft 118 is an actuator assembly 120. The actuator assembly 120 includes a comb-like structure 122 having a plurality of arms 123. Attached to the separate arms 123 on the comb 122 are load beams or load springs 124. Load beams or load springs are also referred to as suspensions. Attached at the end of each load spring 124 is a slider 126 which carries a magnetic transducer head 150. The slider 126 with the transducer 150 form what is frequently called the head. It should be noted that many sliders have one transducer 150 and that is what is shown in the figures. However, this invention is equally applicable to sliders having more than one transducer, such as what is referred to as an MR or magneto resistive head in which one transducer 150 is generally used for reading and another is generally used for writing.

On the end of the actuator assembly 120 opposite the load springs 124 and the sliders 126 is a voice coil 128. Located above and below the voice coil 128 is a first magnet 130 and a second magnet 131. As shown in FIG. 1, the first magnet 130 is associated with the cover 114 while the second magnet is adjacent the housing 112. The first and second magnets 130, 131, and the voice coil 128 are the key components of a voice coil motor which applies a force to the actuator assembly 120 to rotate it about the actuator pivot shaft 118. Also mounted to the housing 112 is a spindle motor (not shown). The spindle motor includes a rotating portion called the spindle hub 133. In this particular disc drive, the spindle motor is within the hub. In FIG. 1, a number of discs 134 are attached to the spindle hub 133. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or, alternatively, under the hub.

The disk drive 100 includes the mechanical components discussed above as well as various electronic components such as a printed circuit board (not shown) typically attached to the lower (as viewed in FIG. 1) side of the housing 112. Without the circuit board and other electronics, the disc drive is often referred to as a head disc assembly or HDA 152. Stated alternatively, the mechanical components, including the drive housing 112, cover 114, actuator assembly 120, pivot shaft 118, arms 123, transducer heads 150, spindle hub 133, spindle shaft 138, and discs 13, among others, generally define the HDA 152. The HDA is a convenient sub-assembly for completing various manufacturing processes including servo track writing. For instance, the HDA provides physical access to the voice coil 128 during manufacture via apertures 136 but can thereafter be sealed (hermetically if necessary) to ensure that the internal components remain substantially contaminant-free. Near the end of production, the drive electronics are assembled to the HDA 152 to produce the disc drive 100.

Figure 2:
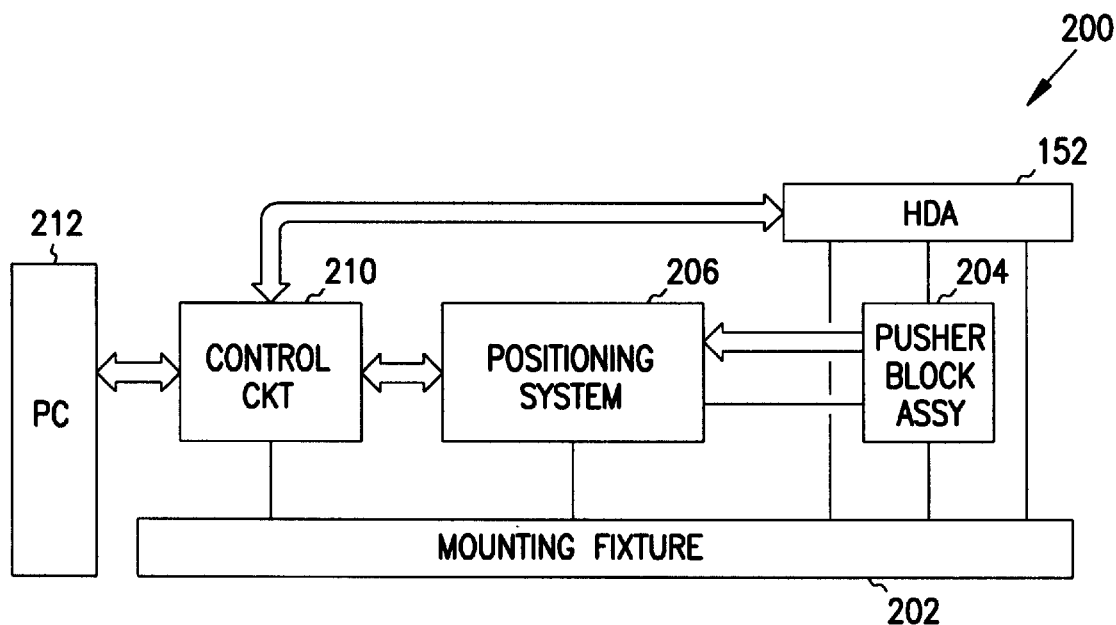
FIG. 2 is a schematic representation of a servo track writer used to write the servo information to the discs of the head disc assembly of FIG. 1.

Referring now to FIG. 2, shown therein is a schematic representation of a servo track writer 200, constructed in accordance with the preferred embodiment of the present invention. As discussed below, the servo track writer 200 serves to write the servo information to the discs 134 (shown in FIG. 1) during manufacturing of the HDA 152.

As shown in FIG. 2, the HDA 152 is mounted over a mounting fixture 202 which serves as a mechanical reference for the servo track writer 200. The mounting fixture 202 typically comprises a granite block (not separately designated in FIG. 2) having a calibrated, level top surface on which a mounting plate (also not separately designated in FIG. 2) is placed. The mounting plate includes clamps (not shown) which locate and secure the HDA 152 to the mounting fixture 202. As such mounting fixtures 202 are well known, additional discussion will not be provided herein except to state that the HDA 152 is mounted in such a manner so as to provide access to the E-block of the actuator assembly 120 (shown in FIG. 1) by the servo track writer 200 during a servo write operation.

Continuing with FIG. 2, a pusher block assembly 204 is also mounted to the mounting fixture 202 underneath the HDA 152 so as to engage the actuator assembly 120 of the HDA 152 in order to selectively position the actuator assembly 120 relative to the discs 134. Typically an opening (not shown) is provided in the bottom of the deck or base 112 (shown in FIG. 1) of the HDA 152 so that the pusher block assembly 204 can access the internal environment of the HDA 152 by extending up through the opening in the deck or base 112. Once the servo information is written, the opening is typically covered by an adhesive label or other means to seal the internal environment of the HDA. Further, it will be recognized that, as actuator assemblies (such as shown at 120 in FIG. 1) typically include a mechanical bias either towards the inner or the outer diameter of the discs 134, the pusher pin engages the actuator against this bias and exerts a horizontal force upon the actuator. Thus, it is unnecessary to mechanically secure the pusher block assembly 204 to the actuator assembly 120; instead, the existing bias of the actuator assembly is typically used to ensure contact is maintained between the pusher block assembly 204 and the actuator assembly 120.

Moreover, the servo track writer 200 further comprises a positioning system 206 which rotates the pusher block assembly 204 about a central axis (not shown in FIG. 2, for purposes of clarity) in order to advance the position of the actuator assembly 120. The position of the pusher block assembly 204 is controlled by the positioning system 206 through detection means (not separately shown) which detects the position of the pusher block assembly 204 and provides correction signals to a motor (also not separately shown) of the positioning system 206 in order to rotate the pusher block assembly 204 accordingly. In the preferred embodiment, the positioning system 206 comprises a laser based, closed loop positioner utilizing a laser and appropriate sensors to detect the position of the pusher block assembly 204, although it will be recognized that other types of positioning systems can be used. One such laser based positioning system is model 137K15, manufactured by Teletrak Inc. As will be recognized, the positioning system 206 is mounted to the mounting fixture 202 relative to the HDA 152.

Continuing with FIG. 2, the servo track writer 200 is further shown to include a control circuit 210 which interfaces with a PC 212 and controls the operation of the servo track writer 200 and the HDA 152 during a servo write operation, including the transfer of the servo information to the HDA 152 from the PC 212.

During operation of the servo track writer 200 to write the servo information to the HDA 152, a user mounts the HDA 152 to the mounting fixture 202 and instructs the servo track writer 200 (by way of the PC 212) to commence writing the servo information to the HDA 152. As a result, the controller circuit 210 instructs the HDA 152 to commence rotation of the discs 134 by way of the spindle motor 16 (shown in FIG. 1) and instructs the pusher block assembly 204 to place the actuator assembly 20 at a starting position (typically near the outer diameter of the discs 134). The servo track writer 200 will thereafter instruct the HDA 152 to write the servo information to each of the surfaces of the discs 134, while mechanically advancing the pusher block assembly 204 so as to define each new successive track on the discs 134. For dedicated servo systems, the entire surface of one of the discs 134 will receive the servo information, written by the corresponding servo head 150 (shown in FIG. 1). For embedded servo systems, each of the heads 150 in turn will write the servo information to the corresponding discs at the appropriate locations.

The time required to write the servo information to a typical HDA depends upon the amount of servo information to be written to the discs, the rotational speed of the discs 134 and the number of discs 134, but for purposes of reference, it may take the servo track writer 200 as much as 30 minutes to complete the servo write operation. Typically, the servo write operation requires a relatively significant amount of time in a large scale disc drive manufacturing operation wherein thousands of disc drives are manufactured each day. Hence, the importance of correctly writing the servo information to the HDA 152 will be recognized, as the time required to rewrite servo information to a population of drives can be extensive. Although servo track writers 100 typically perform some level of testing of the servo information, frequencies in the PES may not be detected until subsequent manufacturing operations when the PCB is mated with the HDA 152 and system level testing of the disc drive is performed.

Figure 3:
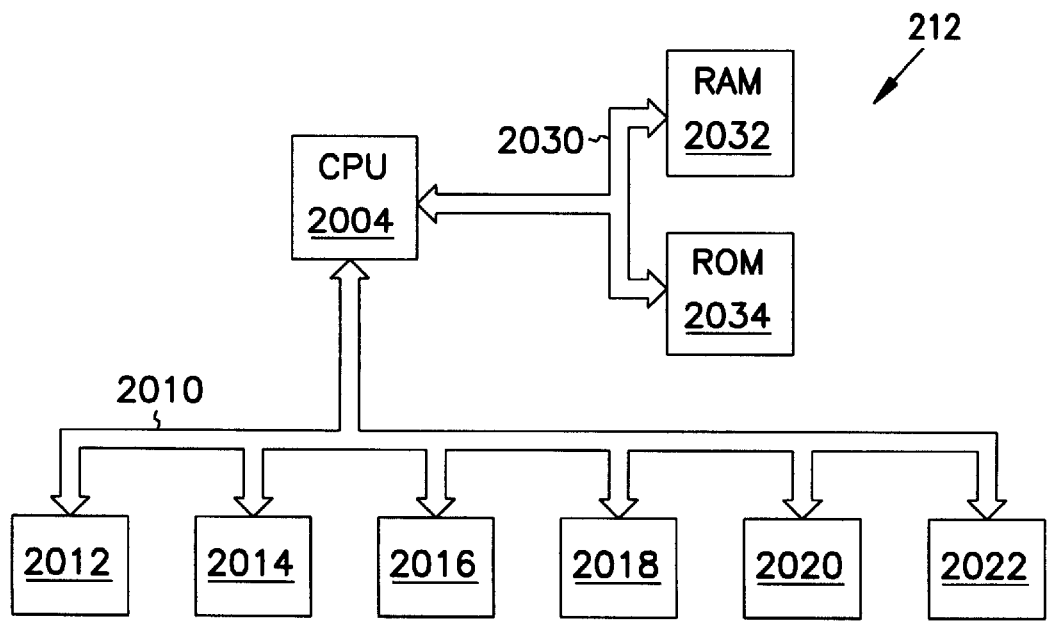
FIG. 3 is a schematic view of the personal computer used as part of the servo track writer.

FIG. 3 is a schematic view of a computer system, such as the personal computer 212 shown in FIG. 2. The computer system 2000 may also be called an electronic system or an information handling system or a controller and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 is attached to the HDA 152 attached to the servo writer 200. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. The personal computer 212 is used as a controller for the servo writer 200. The personal computer 212 may receive data and output control signals for moving the actuator 120 of the HDA 152. The personal computer 212 is used to perform operations on the data input thereto.

Figure 4:
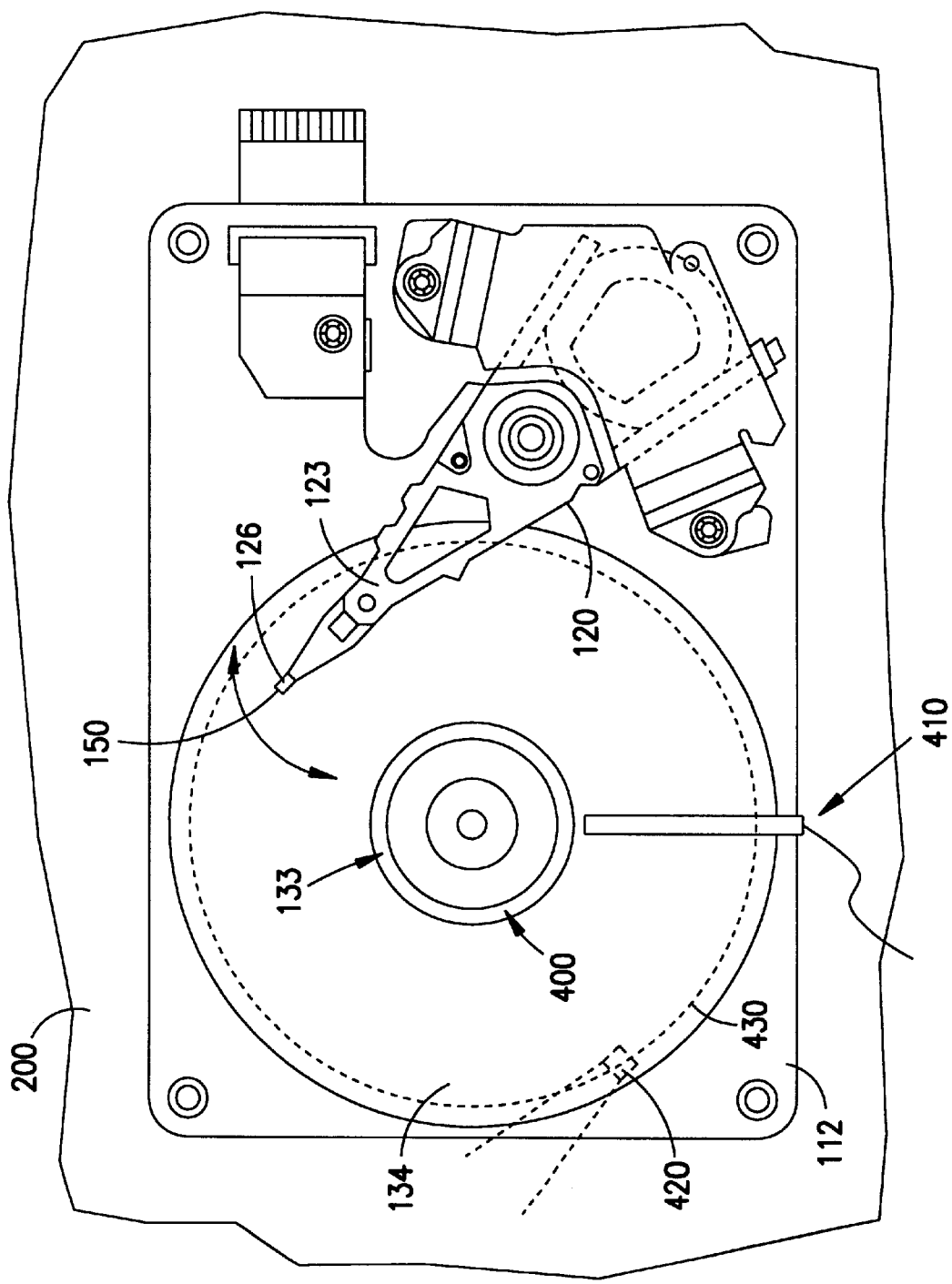
FIG. 4 is a top view of a head disc assembly positioned within a servo track writer.

FIG. 4 is a top view of a head disc assembly 152 positioned within a servo track writer 200. The head disc assembly 152 shown in FIG. 4 is for a disc drive 100 which is different than the disc drive from FIG. 1. It should be noted that a servo writer 200 can be used to write servo track to the disc drives. The head disc assembly 152 shown in FIG. 4 includes at least one disc 134 and an actuator 120. The actuator 120 includes arms 123 which carry sliders 126. A transducer head 150 is positioned within the slider 126. The disc 134 is placed on the hub 133. The hub is placed on a spindle which is essentially a shaft about which the hub 133 rotates. A spindle bearing (not shown) is positioned between the spindle or shaft and the hub 133. The disc or discs are clamped to the hub with a disc clamp 400. The disc clamp 400 is annular and fits over the top of the hub 133. A clock head 420 is positioned over the disc 134 when it is placed in the servo writer 200. The clock head 420 is used to write a clock track 430 to the disc 134. Reading the clock track 430 with the clock head 420 generates a clock signal. The clock signal is used to control the spindle speed. The clock signal generated is also used to time generation of servo patterns written to the disc 134 with the transducing head 150.

Figure 5:
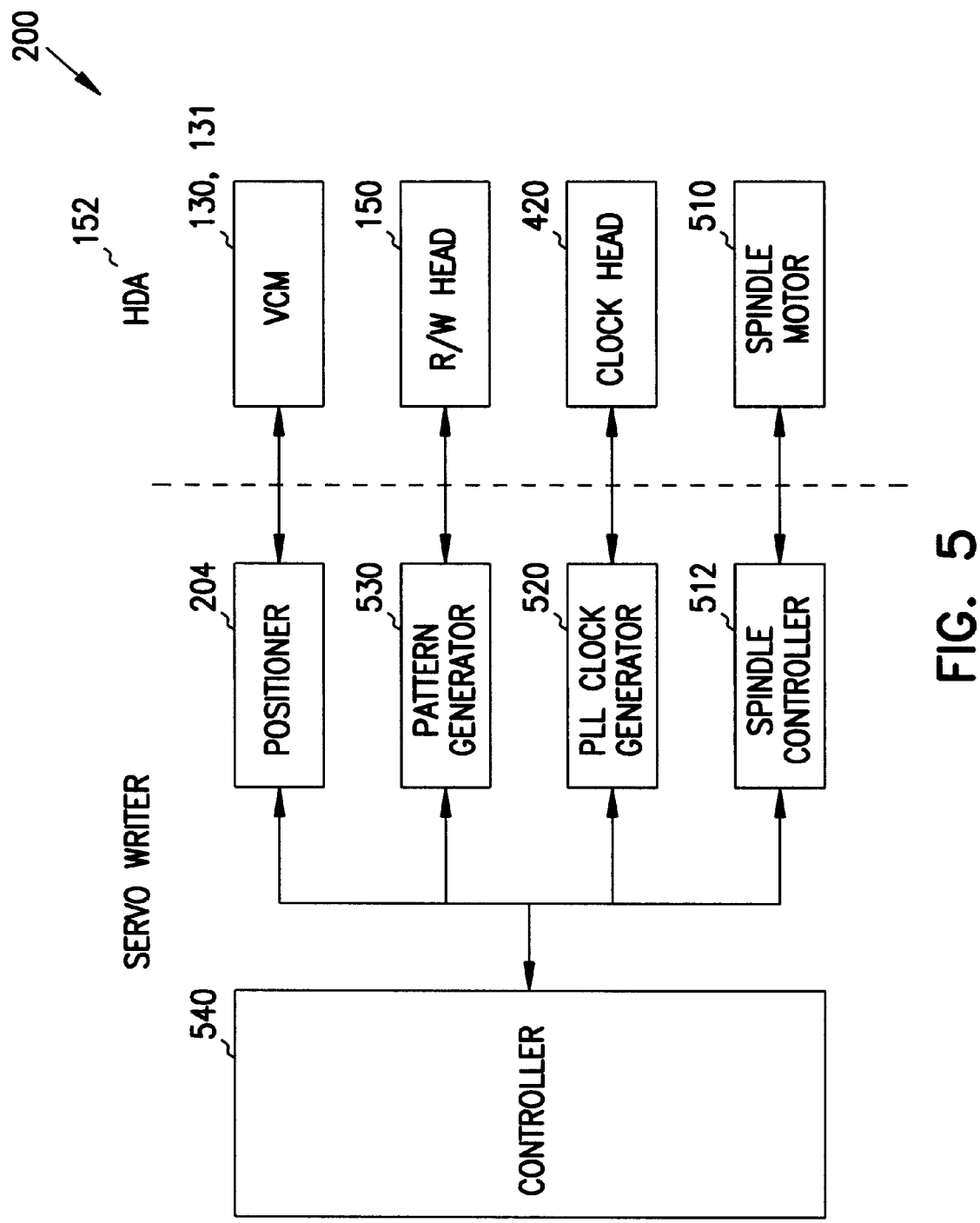
FIG. 5 is a block diagram of the servo track writer.

Turning now to FIG. 5, a block diagram of the servo track writer 200 is shown. The servo track writer 200 includes a positioner 204 which is used to control the voice coil motor 130, 131. The voice coil motor 130, 131 moves the actuator 120 which in turn moves the read/write head 150 so that it is microstepped to a new position for writing servo patterns. The positioner 204 controls the microstepping of the read/write heads 150 with the help of a laser-optical sensor (not shown). The head disc assembly or HDA 152 includes a spindle motor 510. The servo track writer 200 includes a spindle controller 512 which controls the rotational speed of the disc 134 (shown in FIGS. 1 and 4). The spindle controller 512 spins the spindle motor 510 at a first speed which equals the operating speed of the disc drive 100 when the clock head 420 is used to write the clock track 430. The spindle controller 512 rotates the disc 134 at a second selected speed for writing the servo pattern to the disc or to both surfaces of one of the discs 134. Typically, the second selected speed is faster than the operating speed so that the throughput at the servo track writer 200 is increased during the manufacturing process. The clock head 420 reads the clock track 430 on the disc drive 134 and produces an input to a phase lock loop clock generator 520 of the servo track writer 200. The phase lock loop clock is locked onto the clock track 430 on the disc and will compensate for any spindle motor 510 jitter or speed error while servo writing is taking place. The phase lock loop clock generator output is a clock signal which is fed to a pattern generator 530. The pattern generator writes the servo pattern to the disc 134 or to the first and second surfaces of the disc 134. The pattern generator 530 places wedges of servo information onto the surfaces of the disc 134. The positioner tool for the pattern generator 530, the phase lock loop clock generator 520 and the spindle controller 512 are all controlled by a controller 540 within the servo track writer 200.

Figure 6:
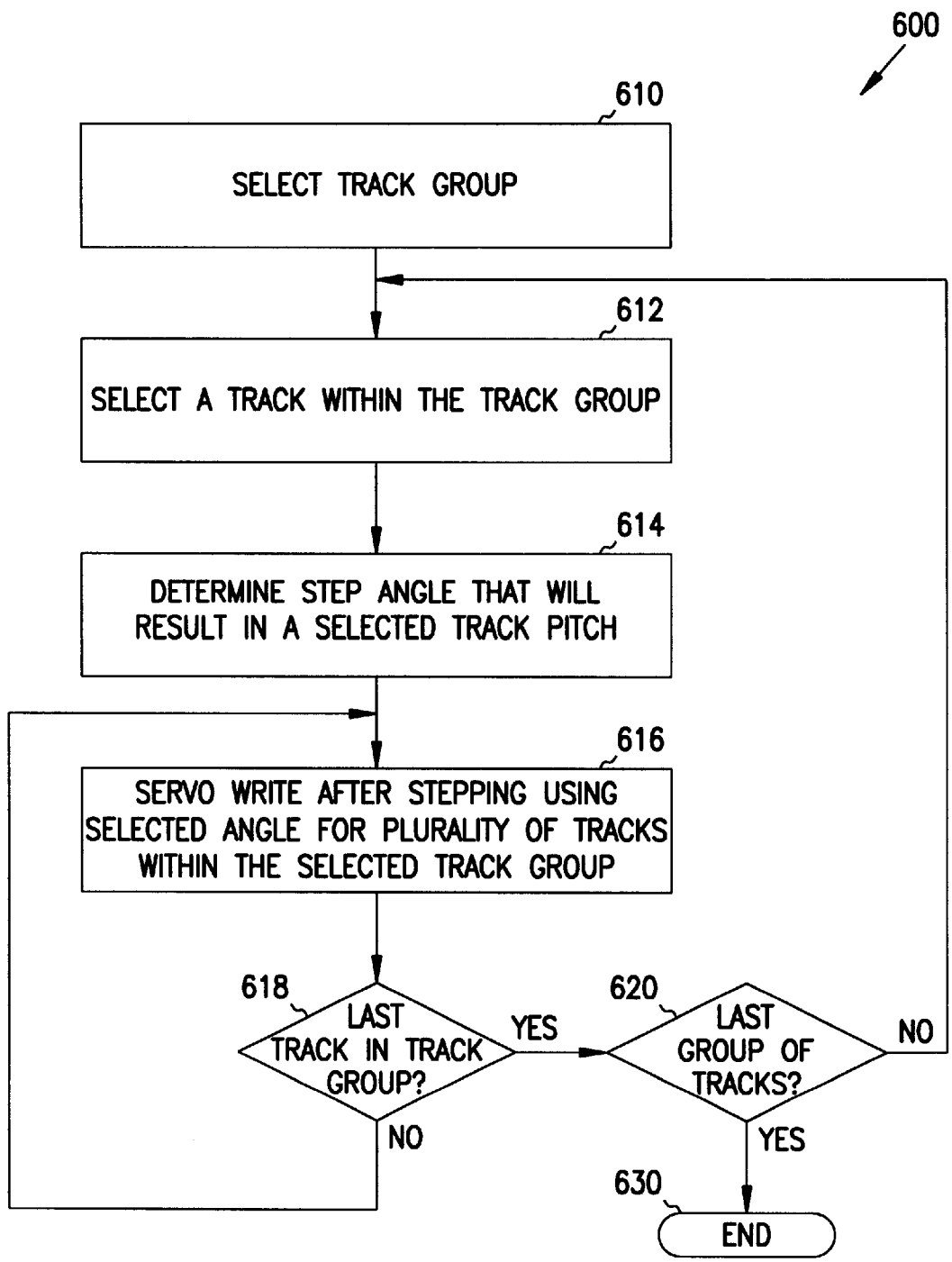
FIG. 6 flow diagram of the method of servo writing.

FIG. 6 is a flow diagram 600 of the method of servo writing which uses a segmented constant angle track pitch. The first step is to select a track group as depicted by reference numeral 610. Once a track group is selected, a track is selected within the track group, as depicted by reference numeral 612. Next, the step angle is determined that will result in a selected track pitch, as shown by reference numeral 614. The selected track pitch is a constant that occurs repeatedly within each track group as the servo writer continues to write tracks on to the surface of the disk 134. Once the step angle is determined that would result in a selected track pitch for a track within a track group, the entire group of tracks within the selected track group is servo written using the same constant angle for the plurality of tracks within the selected group, as depicted by reference numeral 616. Preferably, all the tracks within a track group would be written with the same determined step angle. The end result is that across a particular group of tracks, there will be variability in the track pitch. The track pitch will increase as the tracks in the group move from an inner diameter to an outer diameter. The group of tracks is less than all the tracks on the disk and, therefore, the variability in the track pitch will be bracketed between a first value and a second value. The next step is to determine if the last track in the group is being servo written or has been servo written, as depicted by step 618. If the last track has not been servo written, the servo writer again steps the actuator assembly 120 over using the determined angle to write the next track in the track group. Step 616 and step 618 are repeated until the last track in the track group has been servo written. When the last track in the track group has been servo written, it is then determined whether or not the track is also in the last group of tracks on the disk, as depicted by reference number 620. If this is the last track in the last group of tracks, then the process ends, as depicted by reference numeral 630. If not, steps 612, 614 and 616 are repeated until the last track in the last group of tracks is written to thereby end 630, the process.

Figure 7:
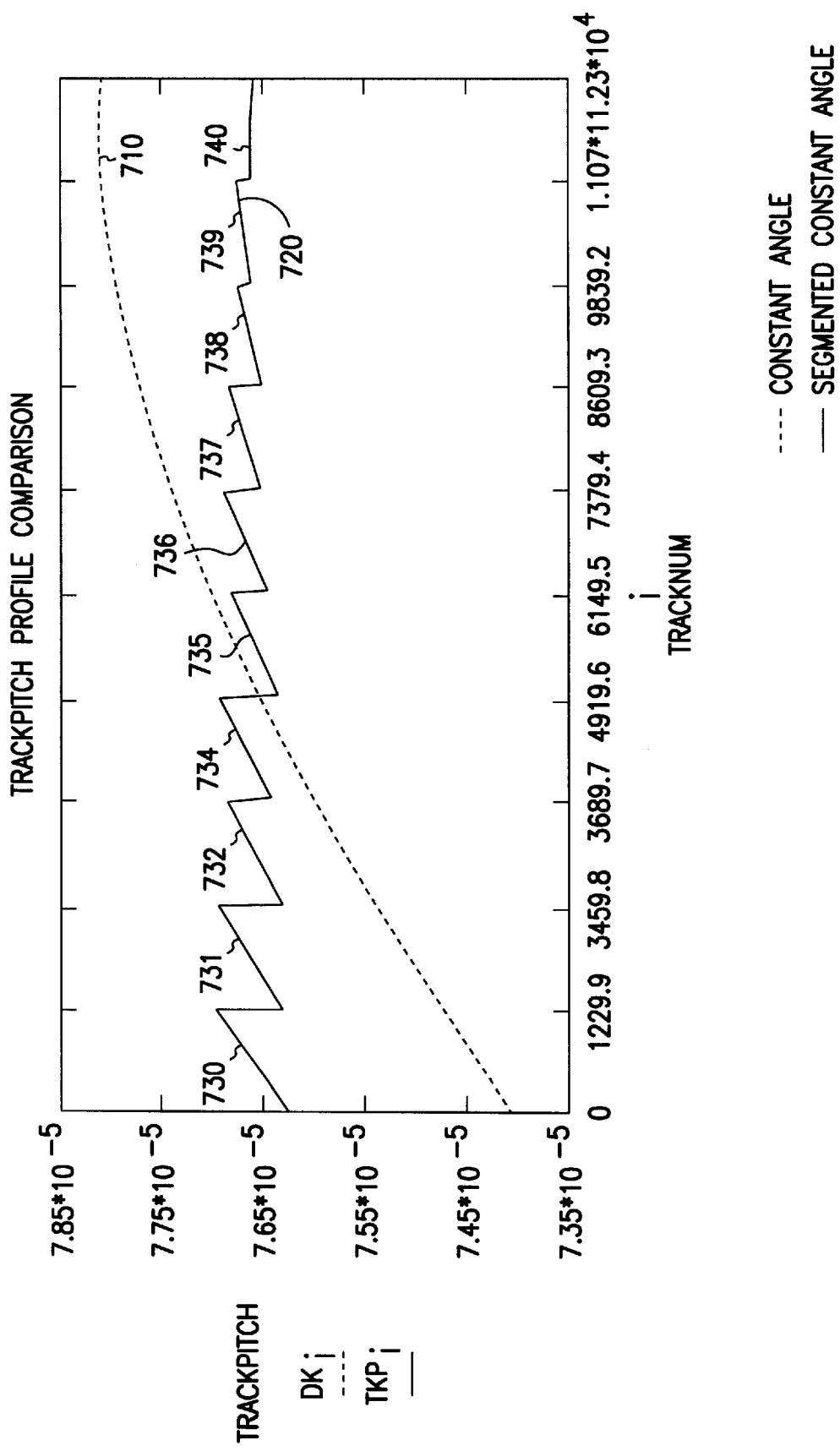
FIG. 7 is a chart of the trackpitch profile comparing trackpitch to track number using the inventive method to the constant angle method.

FIG. 7 graphically depicts the result of the process described in FIG. 6. FIG. 7 is a chart of the track pitch profile comparing track pitch in which a constant angle is used for each track on the disk. The curve showing the track pitch using constant angle is designated by the reference numeral 710. The curve which uses the inventive segmented constant angle is depicted by the reference numeral 720. The Y axis represents the track number starting at track 0 and ending at track N. The Y axis shows the track pitch in linear units. As can be seen, the variation in track pitch using the constant angle method 710 is widely variable whereby the track pitch at the inner diameter is low and track pitch at the outer diameter of the disk 134 is high. There is a wide variability in the track pitch using a constant angle 710 method. In contrast, the segmented constant angle method 720, which was described in FIG. 6, produces a sawtooth type curve. Basically, the track pitch varies across a group or select number of tracks. After the select number of tracks are written within the group, the servo track writer recalibrates the constant angle so that it will produce a track pitch of a selected amount and then the next group is written using that newly calculated or determined step angle throughout the group. As can be seen from FIG. 7, there is a first group 730 of track, a second group 731 of track, a third group 732, a fourth group 734, a fifth group 735, a sixth group 736, a seventh group 737, an eighth group 738, a ninth group 739, and a tenth group 740 of tracks. Within a particular group, for example group 730, the track pitch varies from a low number on the tracks that are closer to the inner diameter to a higher number for the tracks within the group that are positioned nearer to the outer diameter of the disk. Moving on to the next group, track group 731, the angle that will determine a constant track pitch is redetermined for a track in the track group 731 and then the track pitch varies across the groups in the track from a lower number where the tracks are more closely positioned to the inner diameter of the disk to a higher number where the last track in group 731 is positioned toward the outer diameter of the disk. This is repeated for each of the remaining groups 732, 734, 735, 736, 737, 738, 739, and 740. The end result is that the track pitch is much more uniform. The track pitch does vary, however it only varies across a particular group 730, . . . 740. Therefore, the track pitch variability is reduced. Reducing the variability also increases the off-track capability of the read head 150 of the disk drive 100.

FIG. 8 is a table which also compares the constant angle method of stepping during servo writing with the segmented constant angle method. As can be seen from FIG. 8, the constant angle method results in an average track pitch of 76.67 micro inches. The maximum track pitch difference using the constant angle method is approximately 4.01 micro inches. In contrast, the segmented constant angle method results in an average track pitch of 76.61 micro inches and the maximum track pitch difference across the track is 0.72 micro inches. Thus, there is an improvement in the variability of approximately 3.3 micro inches using the segmented constant angle method described herein.

Figure 9:
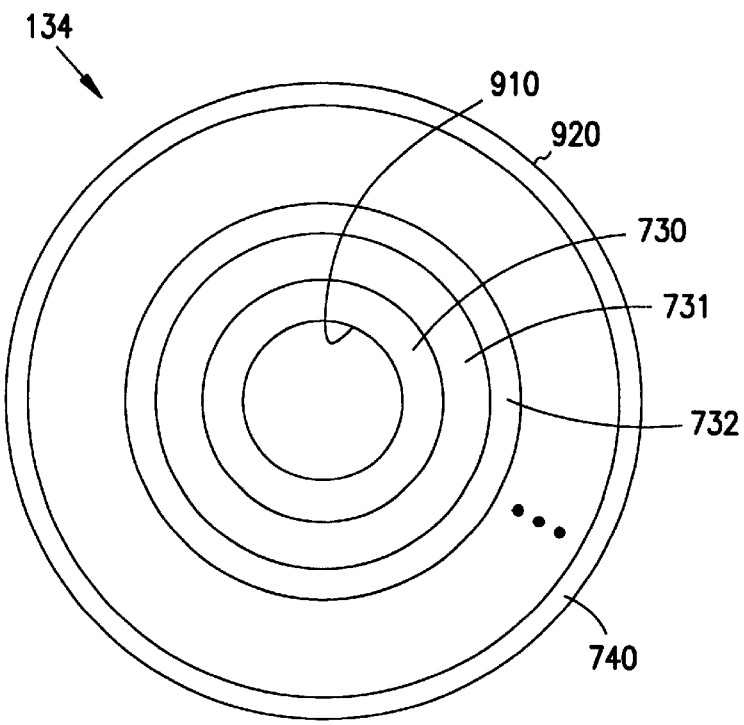
FIG. 9 is a disc showing sets of tracks.

FIG. 9 is a disk 134 showing sets or groups of tracks. As depicted in FIG. 7, there are ten groups of tracks, although not all are shown in FIG. 9. The first set or group of tracks 730 is located toward an inner diameter 910 of the disk 134. A second group of tracks 731 is located adjacent the first group 730 of set of tracks and is located between the inner diameter 910 and the outer diameter 920 of the disk 134. The last group 740 is located near or adjacent the outer diameter 920 of the disk. There are ten groups of tracks depicted in FIG. 9. Only four groups 730, 731, 732, and 740 are shown.

The remaining groups 734, 735, 736, 737, 738, and 739 are represented by the dots shown on the surface of the disk 134 in FIG. 9. It should be noted that the number of groups of tracks on the disk need not be set at a specific number. Of course, the higher the number of groups of or sets of tracks on a disk the less variability in the track pitch. Essentially, a smaller grouping of tracks has less variability since there is a smaller distance between the inner diameter tracks and the outer diameter tracks within a specific group.

Figure 10:
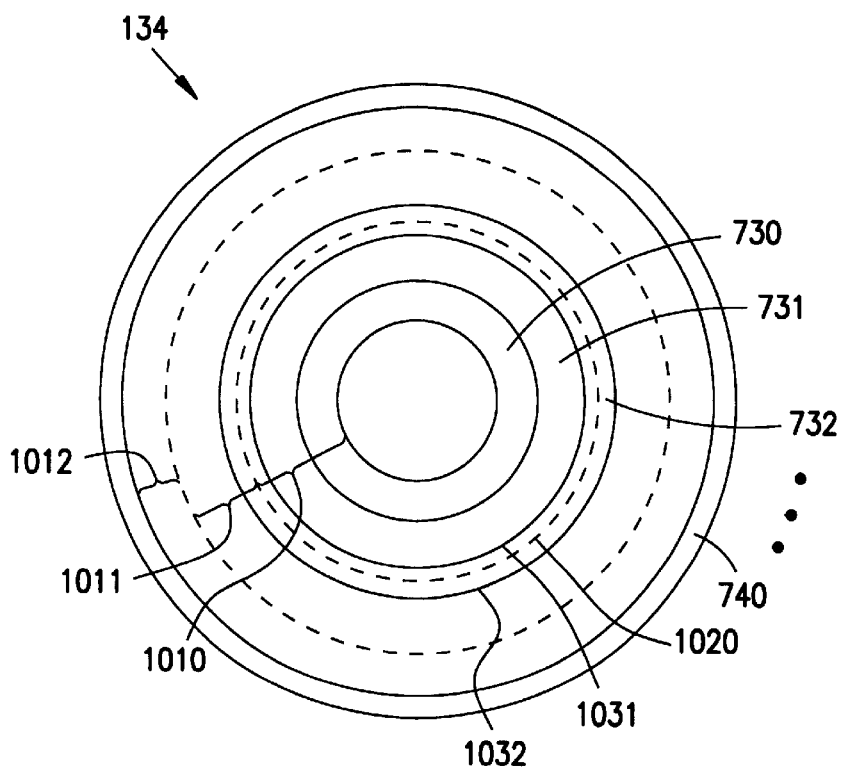
FIG. 10 is a disc showing sets of tracks and zones in which zones using zone bit recording.

FIG. 10 shows a disk 134 having sets of tracks 730, 731, 732, 734, 735, 736, 737, 738, 739, and 740. The disk 134 shown in FIG. 10 also includes zones that are used in zone bit recording. There is a first zone 1010, a second zone 1011, and a third zone 1012. These boundaries between the zones are depicted by dotted lines. The boundaries between the track groups or sets of tracks 730, 731, 732, 734, 735, 736, 737, 738, 739, and 740 are shown in solid lines. FIG. 10 shows that these boundaries between a first zone and a second zone do not necessarily correspond to the boundaries between a first set or groups of tracks and a second set or group of tracks. For example, the boundary between zone 1010 and zone 1011 is shown by reference numeral 1020. The boundary 1020 is located between the boundaries 1031 and 1032. Boundaries 1031 and 1032 bound or depict the beginning and end of the track set 732. In zone bit recording, the bits per inch within a particular zone are constant. Therefore, data at an inner zone 1010 will be recorded at a first frequency and data in a second zone 1011 will be recorded at a second frequency. The second frequency associated with zone 1011 will be higher and therefore the linear density or bits per inch within zone 1011 will be also higher. It should be noted that there is not necessarily a correspondence between the zone boundaries, such as 1020, and the boundaries between sets or groups of tracks, such as 1031 and 1032. Therefore, it is possible to have a set of tracks, such as set 732, where one of the tracks within the set of tracks 732 corresponds to a boundary 1020 between a first zone 1010 and a second zone 1011. As a result, the tracks in group 732 have a first linear density as well as a second linear density.

Figure 11:
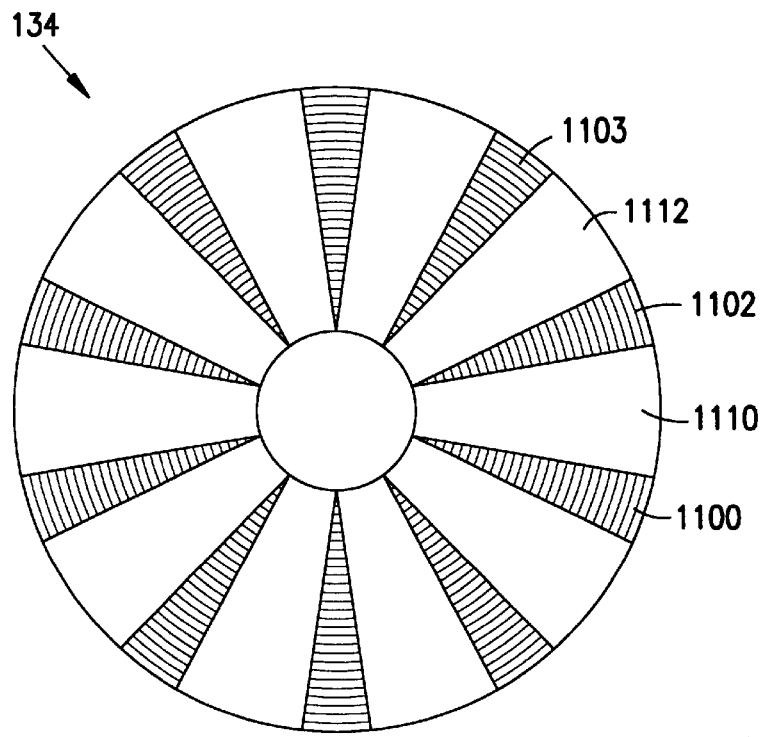
FIG. 11 is a disc having embedded servo.

FIG. 11 shows a disk 134 having imbedded servo. It should be noted that the tracks which have been depicted in FIGS. 9 and 10 have been removed for the sake of clarity. Imbedded servo means that the servo information on the main surface of the disk 134 and is located in servo wedges 1100, 1102, and 1103. The servo wedges include servo data which is used to locate the tracks on the disk. Data or other information is located between the servo wedges 1100, 1102, and 1103. Data areas are depicted by reference numeral 1110 and 1112 in FIG. 11. It should be noted that ten servo wedges are shown. Only three servo wedges are numbered. It should be noted that there generally are many more servo wedges in today's disk drive. For example, in today's disk drives it is not uncommon to have as many as 120 servo wedges on a major surface of the disk 134. The invention described with respect to FIGS. 6 through 10 works on disk drives that use imbedded servo.

Figure 12:
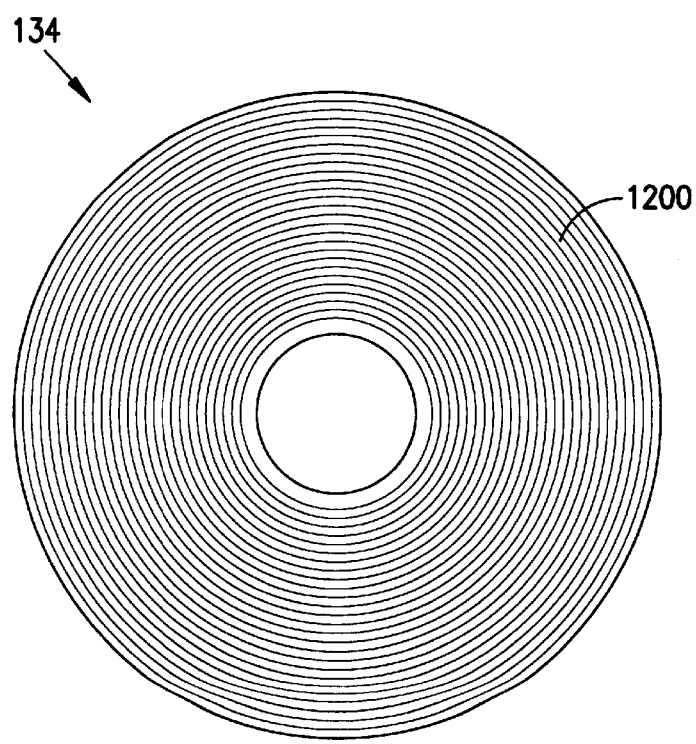
FIG. 12 is a disc having dedicated servo.

The invention described herein also works on disk drives that use a dedicated servo surface. FIG. 12 shows a disk 134 which includes a dedicated servo surface 1200. In a dedicated servo system, one full disk surface 1200 is provided with servo information. Again, it should be noted that this particular invention works with both common types of servo, namely imbedded servo and dedicated servo as shown in FIGS. 11 and 12, respectively.

Figure 13:
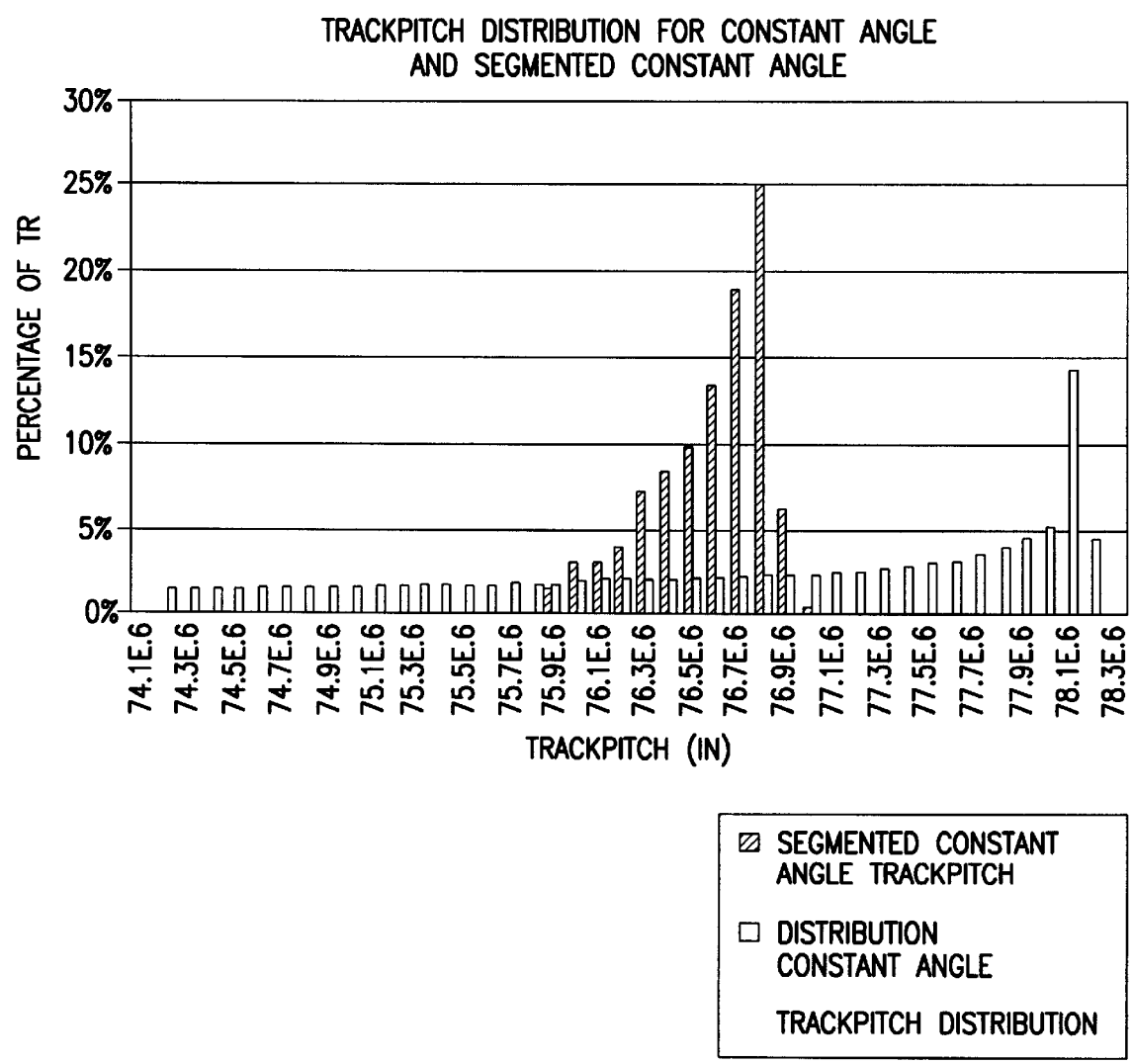
FIG. 13 is a graph of the trackpitch distribution for constant angle vs. the inventive segmented constant angle method.
Figure 14:
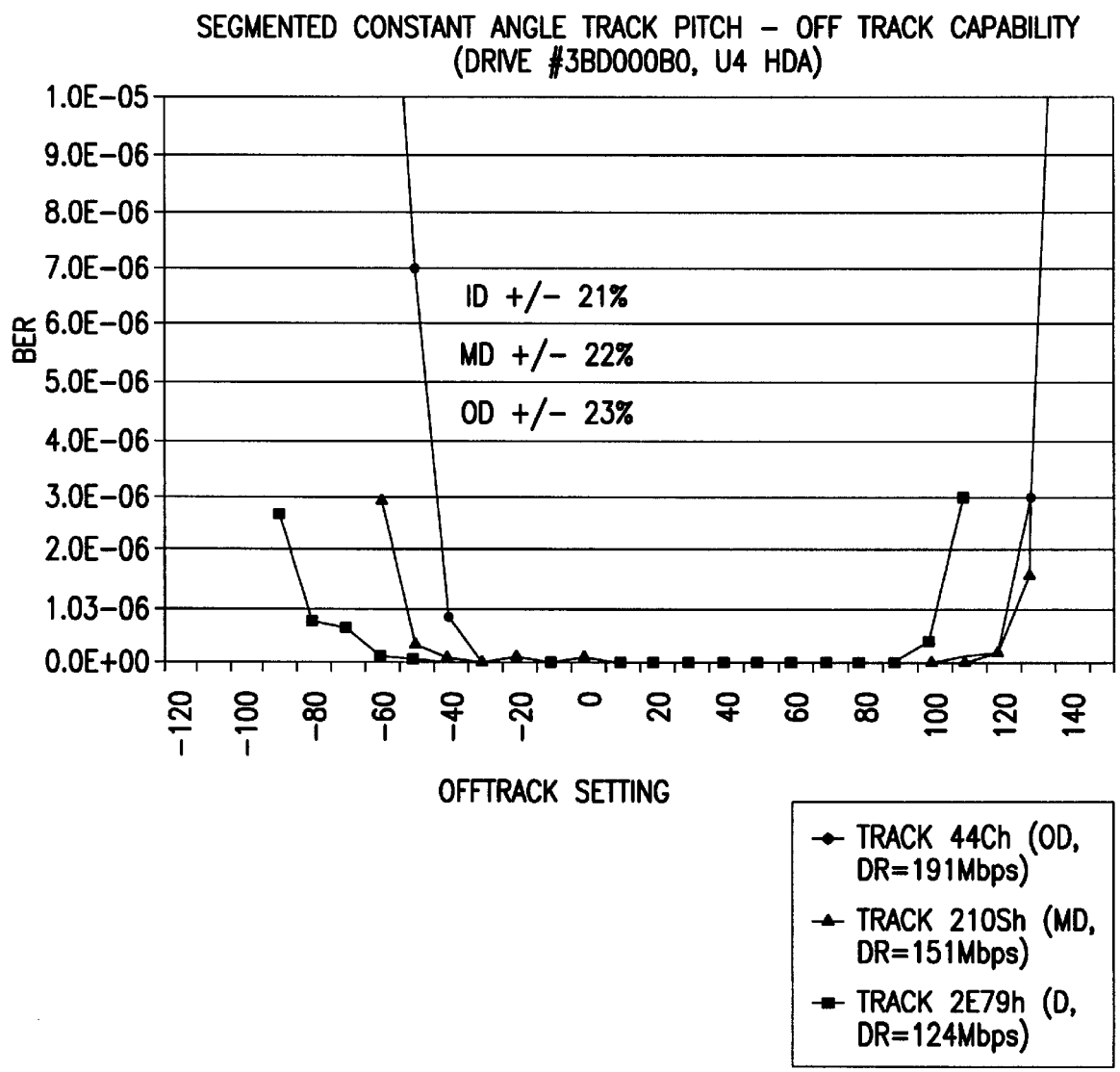
FIG. 14 is a graph showing the off track capability for the inventive segmented constant angle method.

FIG. 14 is a graph showing the off-track capability for the invented segmented constant angle method used in servo writing disks within a disk drive 100. FIG. 13 is actually a histogram which shows the track pitch distribution for a constant angle method as well as a segmented constant angle track pitch distribution. As can be seen, the track pitch in inches is shown on the X axis while the percentage of tracks are shown on the Y axis. Using the constant angle track pitch, it can be seen that the solid bar, with the exception of one, each have less than five percent of the total number of tracks written at that particular track pitch. Meanwhile, when looking at the gray bars which depict the segmented constant angle track pitch distribution, there are three bars under five percent, four bars between five and ten percent and three more bars over ten percent. The track pitch is distributed over a much smaller range of numbers.

In essence, the track pitch is much more uniform as depicted by FIG. 13.

FIG. 14 is a graph showing the off-track capability for using the inventive segmented constant angle method. On the Y axis, the number of errors are set forth. The number of errors increase as the Y axis increases. On the X axis, the track center or zero marking is set forth in the middle of the X axis. Positive and negative off-track settings are then shown as they vary from zero or track center. Three curves are shown, one for tracks at the inner diameter, one for tracks at a middle diameter 1420, and finally a track at the outer diameter 1430. It can be seen that the track can be moved proximately 30 units each way of track center before there are any problems. Furthermore, it can be seen that the transducer or read head 150 can be moved 90 units in the positive direction before the error rate, depicted on the Y axis, increases. The end result is that the track pitch is much more uniform across the surface of the disk 134 when using the inventive segmented constant track pitch approach described herein. Since the track pitch is much more constant or uniform, the off-track capability is increased. In other words, because the tracks are essentially wider across the surface of the disk, there is much more room for error as depicted by the better off-track performance depicted in FIG. 14.

Advantageously, the method and apparatus of the present invention allows servo patterns to be written on the various tracks of the disc so that the off track performance is balanced between tracks at or near the inner diameter of the disc and tracks at or near the outer diameter of the disc. Using the method and apparatus of the present invention, the off track performance and off track capability is more uniform between the tracks at the inner diameter of the disc drive to the tracks at the outer diameter of the disc drive.

CONCLUSION

In conclusion, the invention is a method for writing servo patterns on at least one disc 134 in a disc drive 100 that has a first set of tracks and a second set of tracks on a major surface of the disc includes stepping between the tracks of the first set of tracks 731 at a first constant angle, and stepping between the tracks of the second set of tracks 732 at a second constant angle. The method also includes writing servo information to the first set of tracks 731 and the second set of tracks 732. The stepping process occurs between adjacent tracks in the first set of tracks 731 and between adjacent tracks in the second set of tracks 732. The method also includes grouping a first set of adjacent tracks to form the first set of tracks 731, and grouping a second set of adjacent tracks to form the second set of tracks 732. Stepping between tracks in the first group 731 includes selecting two adjacent tracks from first group of tracks, and determining the angle through which an actuator assembly must be rotated between the two adjacent tracks selected to produce a selected track pitch. The determined angle is used to step between adjacent tracks within the first group of tracks 731. This procedure results in a disc 134 having a first grouping of tracks where the track pitch is lower between the tracks 733 of the first grouping nearer the inner diameter of the disc and higher between the tracks of the first grouping nearer the outer diameter of the disc.

The method also includes the steps of selecting two adjacent tracks from second group of tracks 612, and determining the angle 614 through which an actuator assembly must be rotated between the two adjacent tracks in the second group of tracks 732 to produce a selected track pitch. The determined angle is used to step between adjacent tracks within the second group of tracks 732. The method for writing servo patterns results in a disc 134 having a first grouping of tracks 731 where the track pitch is lower between the tracks of the first grouping nearer the inner diameter of the disc and higher between the tracks of the first grouping nearer the outer diameter of the disc, and having a second grouping of tracks 732 where the track pitch is lower between the tracks of the second grouping nearer the inner diameter of the disc and higher between the tracks of the second grouping nearer the outer diameter of the disc. The track pitch of some of the tracks of the first group 731 is higher than the track pitch of the tracks in the second group 732. The track pitch of some of the tracks nearer the outer diameter of the first group is higher than the track pitch of the tracks nearer the inner diameter of the second group. The method may also include writing servo information 1100 to the first set of tracks 731 and the second set of tracks 732 to produce a disc having a first set of tracks 731 with a varying track pitch and a second set of tracks 732 with a varying track pitch in which the track pitch of some of the tracks nearer the outer diameter of the first set of tracks is higher than the track pitch of the tracks nearer the inner diameter of the second set of tracks.

Also disclosed is a disc 134 for a disc drive 100 includes a first set of tracks 1010, and a second set of tracks 1011. The track pitch for the first set of tracks 1010 varies from a first track pitch value 730 to a second track pitch value 731. The track pitch for the second set of tracks 1011 varies from a third track pitch value 732 to a fourth track pitch value 733. The third value of track pitch 732 is less than the second value of track pitch 733. The track pitch varies in a linear fashion across the first set of tracks 1010 and in a linear fashion across the second set of tracks 1011. The track pitch may vary in a linear fashion from the first track pitch value to the second track pitch value within the first set of tracks, and in a linear fashion from a third track pitch value to a fourth track pitch value within the second set of tracks. The number of bits per inch within a first tracks 1010 within the first set of tracks may differ from the number of bits per inch within a second track within the first set of tracks. The disc may further include a first zone 1010 and a second zone 1011. The first zone includes a plurality of tracks wherein the number of bits per inch is at a first bit per inch value. The second zone includes a plurality of tracks wherein the number of bits per inch is at a second bit per inch value. The boundary between the first zone 1010 and the second zone 1011 is different than the boundary between the first set of tracks and the second set of tracks. The disc may also include a first zone 1010 including a plurality of tracks wherein the number of bits per inch is at a first bit per inch value, and a second zone 1011 including a plurality of tracks wherein the number of bits per inch is at a second bit per inch value. The first set of tracks may include tracks from the first zone and tracks from the second zone. The disc may have a servo pattern 1100 where the entire surface is covered with servo information. Alternatively, the disc may have a servo pattern where the servo information is found in wedges on the surface of the disc.

Most generally, a disc drive servo track writer for writing servo information to a head disc assembly includes a servo pattern generator, and a device for placing tracks on a disc so that the off track performance is balanced between tracks at or near the inner diameter of the disc and tracks at or near the outer diameter of the disc.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed:

1. A method for writing servo patterns on at least one disc in a disc drive that has a first set of tracks and a second set of tracks on a major surface of the disc, the method comprising the steps of:
    (a) stepping between the tracks of the first set of tracks at a first constant angle by steps comprising:
        (a)(i) selecting two adjacent tracks from first group of tracks;
        (a)(ii) determining the angle through which an actuator assembly must be rotated between the two adjacent tracks selected in step (a)(i) to produce a selected track pitch; and
        (a)(iii) stepping between adjacent tracks within the first group of tracks using the angle determined in step (a)(ii),
    (b) stepping between the tracks of the second set of tracks at a second constant angle.

2. The method for writing servo patterns as recited in claim 1 further comprising the step of (c) writing servo information to the first set of racks and the second set of tracks.

3. The method for writing servo patterns as recited in claim 1 wherein the stepping step (b) includes stepping between adjacent tracks in the second set of tracks.

4. The method for writing servo patterns as recited in claim 1 further comprising the steps of:
    (c) grouping a first set of adjacent tracks to form the first set of tracks; and
    (d) grouping a second set of adjacent tracks to form the first set of tracks.

5. The method for writing servo patterns as recited in claim 1 wherein the stepping step (a) results in a disc having a first grouping of tracks where the track pitch is lower between the tracks of the first grouping nearer the inner diameter of the disc and higher between the tracks of the first grouping nearer the outer diameter of the disc.

6. The method for writing servo patterns as recited in claim 1 wherein the stepping step (b) further comprises steps of:
    (b)(i) selecting two adjacent tracks from second group of tracks; and
    (b)(ii) determining the angle through which an actuator assembly must be rotated between the two adjacent tracks selected in step (b)(i) to produce a selected track pitch; and
    (b)(iii) stepping between adjacent tracks within the second group of tracks using the angle determined in step (b)(ii).

7. The method for writing servo patterns as recited in claim 6 wherein:
    the stepping step (a) results in a disc having a first grouping of tracks where the track pitch is lower between the tracks of the first grouping nearer the inner diameter of the disc and higher between the tracks of the first grouping nearer the outer diameter of the disc; and wherein
    the stepping step (b) results in a disc having a second grouping of tracks where the track pitch is lower between the tracks of the second grouping nearer the inner diameter of the disc and higher between the tracks of the second grouping nearer the outer diameter of the disc, wherein the track pitch of some of the tracks of the first group is higher than the track pitch of the tracks in the second group.

8. The method for writing servo patterns as recited in claim 6 wherein:
    the stepping step (a) results in a disc having a first grouping of tracks where the track pitch is lower between the tracks of the first grouping nearer the inner diameter of the disc and higher between the tracks of the first grouping nearer the outer diameter of the disc; and wherein
    the stepping step (b) results in a disc having a second grouping of tracks where the track pitch is lower between the tracks of the second grouping nearer the inner diameter of the disc and higher between the tracks of the second grouping nearer the outer diameter of the disc, wherein the track pitch of some of the tracks nearer the outer diameter of the first group is higher than the track pitch of the tracks nearer the inner diameter of the second group.

9. The method for writing servo patterns as recited in claim 1 further comprising a step of (c) writing servo information to the first set of tracks and the second set of tracks to produce a disc having a first set of tracks with a varying track pitch and a second set of tracks with a varying track pitch, wherein the track pitch of some of the tracks nearer the outer diameter of the first set of tracks is higher than the track pitch of the tracks nearer the inner diameter of the second set of tracks.

10. A disc for a disc drive comprising:
    a first set of tracks;
    a second set of tracks, wherein the tracks are spaced in each set of tracks to define a preselected track pitch.

11. The disc of claim 10 wherein the number of bits per inch within a first track within the first set off tracks differs from the number of bites per inch within a second track within the first set of tracks.

12. The disc of claim 10 further comprising:
    a first zone including a plurality of tracks wherein the number of bits per inch is at a first bit per inch value; and
    a second zone including a plurality of tracks wherein the number o bits per inch is at a second bit per inch value, wherein the boundary between the first zone and the second zone is different than the boundary between the first set of tracks and the second set of tracks.

13. The disc of claim 10 further comprising:
    a first zone including a plurality of tracks wherein the number of bits per inch is at a first bit per inch value; and
    a second zone including a plurality of tracks wherein the number of bits per inch is at a second bit per inch value, wherein the first set of tracks includes tracks from the first zone and tracks from the second zone.

14. The disc of claim 10 wherein the entire surface is covered with servo information.

15. The disc of claim 10 wherein servo information is found in wedges on the surface of the disc.

* * * * *